United States Patent
Terashima et al.

(10) Patent No.: US 8,766,551 B2
(45) Date of Patent: Jul. 1, 2014

(54) PROJECTOR

(75) Inventors: Tetsuo Terashima, Azumino (JP); Shun Sato, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 315 days.

(21) Appl. No.: 13/323,095

(22) Filed: Dec. 12, 2011

(65) Prior Publication Data

US 2012/0154752 A1   Jun. 21, 2012

(30) Foreign Application Priority Data

Dec. 20, 2010  (JP) ................................. 2010-283287

(51) Int. Cl.
  *H05B 41/16*   (2006.01)

(52) U.S. Cl.
  USPC ........... 315/287; 315/291; 315/307; 315/360; 353/7; 353/85

(58) Field of Classification Search
  CPC ........... H05B 41/2928; H05B 41/2883; H05B 41/2886; G03B 21/00; G03B 21/2026; Y02B 20/208
  USPC ......... 315/287, 291, 300, 302, 307, 360, 312; 353/7, 30, 85
  See application file for complete search history.

(56) References Cited

U.S. PATENT DOCUMENTS

| | | | | |
|---|---|---|---|---|
| 8,120,285 B2 * | 2/2012 | Terashima et al. | ............ | 315/308 |
| 8,138,684 B2 * | 3/2012 | Tanaka et al. | ................. | 315/291 |
| 8,217,582 B2 * | 7/2012 | Yamauchi et al. | ......... | 315/209 T |
| 8,342,695 B2 * | 1/2013 | Hirao et al. | ..................... | 353/85 |
| 8,573,782 B2 * | 11/2013 | Soma et al. | ..................... | 353/85 |
| 8,591,034 B2 * | 11/2013 | Terashima et al. | ................ | 353/7 |
| 2005/0206326 A1 | 9/2005 | Suzuki et al. | | |
| 2008/0024853 A1 | 1/2008 | Tanaka et al. | | |
| 2009/0085495 A1 | 4/2009 | Yamauchi et al. | | |
| 2012/0154757 A1 * | 6/2012 | Terashima | ...................... | 353/30 |
| 2012/0162611 A1 * | 6/2012 | Terashima et al. | ............. | 353/30 |

FOREIGN PATENT DOCUMENTS

| | | |
|---|---|---|
| CN | 1670901 A | 9/2005 |
| CN | 101114116 A | 1/2008 |
| CN | 101400204 A | 4/2009 |
| CN | 100490054 C | 5/2009 |
| JP | A-2003-102030 | 4/2003 |
| JP | A-2009-237302 | 10/2009 |

* cited by examiner

*Primary Examiner* — Haiss Philogene
(74) *Attorney, Agent, or Firm* — Oliff PLC

(57) ABSTRACT

A projector that outputs a first image and a second image alternately while performing switching between the first image and the second image, includes: a discharge lamp driving section that supplies, to a discharge lamp, a drive current that drives the discharge lamp; a state detecting section that detects a deteriorating state of the discharge lamp; and a control section that controls the discharge lamp driving section, wherein the control section controls the discharge lamp driving section so that the absolute value of the drive current becomes relatively small in a first period and relatively large in a second period and controls the discharge lamp driving section so that the ratio of the absolute value of the drive current in the second period to the absolute value of the drive current in the first period is increased with the progress of the deteriorating state.

4 Claims, 11 Drawing Sheets

| DRIVE VOLTAGE Vla [V] | WAVEFORM | IH / IL | f2 [Hz] | f1 [Hz] |
|---|---|---|---|---|
| LESS THAN 70 | A | 1.25 | 480 | 480 |
| 70 OR MORE BUT LESS THAN 80 | B | 1.43 | 480 | 480 |
| 80 OR MORE BUT LESS THAN 90 | C | 1.67 | 240 | 480 |
| 90 OR MORE BUT LESS THAN 100 | D | 2.00 | 240 | 480 |
| 100 OR MORE BUT LESS THAN 110 | E | 2.50 | 240 | 960 |
| 110 OR MORE | F | 3.33 | 120(DC) | 960 |

FIG. 9

PROJECTOR

BACKGROUND

1. Technical Field

The present invention relates to projectors.

2. Related Art

A projector using a discharge lamp such as a high-pressure mercury lamp or a metal halide lamp has been put to practical use. As such a projector, in JP-A-2003-102030, for example, a projector having a unit for varying the intensity of a light source in accordance with a color separation unit or the like in synchronization with a image signal is disclosed. However, JP-A-2009-237302 describes that if the intensity of the light source is simply varied, an electrode of the discharge lamp will wear out significantly.

Moreover, in recent years, a projector that outputs a stereoscopic image by using a discharge lamp such as a high-pressure mercury lamp or a metal halide lamp has been put to practical use.

One of the methods to output a stereoscopic image is a method by which switching between a image for the right eye and a image for the left eye is performed and the image for the right eye and the image for the left eye are alternately output (for example, active shutter glasses technology such as "XPAND beyond cinema" (a trademark of X6D Limited)). In this method, the right eye is made to view the image for the right eye and the left eye is made to view the image for the left eye by using active shutter glasses etc. synchronized with a image signal, whereby the image is made to appear stereoscopically by using parallax between what the right and left eyes see.

When a stereoscopic image is projected by the method by which a image for the right eye and a image for the left eye are alternately output, the amount of light that enters the right eye and the left eye is less than half of the amount of light that enters the right eye and the left eye when an existing two-dimensional image is projected. Moreover, when crosstalk by which the image for the right eye enters the left eye or the image for the left eye enters the right eye occurs, the observer loses the sense of viewing the stereoscopic image. Therefore, it is necessary to provide a period in which both active shutters are closed. As a result, when a stereoscopic image is projected by the method by which a image for the right eye and a image for the left eye are alternately output, the image appears darker than when an existing two-dimensional image is projected. To make the image appear bright, the drive power can be simply increased. However, this increases the power consumption of the projector or accelerates the deterioration of peripheral parts associated with the increase in drive power.

Moreover, if control to reduce the brightness of the discharge lamp in a period in which both active shutters are closed and increase the brightness of the discharge lamp in a period in which one of the active shutters is opened is performed to make the image appear bright, the temperature of the electrode of the discharge lamp is reduced in a period in which the brightness of the discharge lamp is reduced, resulting in inadequate fusibility of the tip of the electrode. This may cause deformation of the electrode. When the electrode is deformed, there is a possibility of, for example, the occurrence of flicker.

In particular, when a drive current of the discharge lamp becomes smaller with the progress of a deteriorating state of the discharge lamp, the brightness of the discharge lamp is reduced and the fusibility of the tip of the electrode becomes inadequate, which makes the electrode tend to be deformed. Therefore, special consideration is needed to project a stereoscopic image in such a way that the stereoscopic image appears bright while preventing deformation of the electrode.

SUMMARY

An advantage of some aspects of the invention is to provide a projector that can project a image in such a way that the image appears bright while preventing deformation of an electrode.

An aspect of the invention is directed to a projector that outputs a first image and a second image alternately while performing switching between the first image and the second image with given switching timing, including: a discharge lamp; a discharge lamp driving section that supplies, to the discharge lamp, a drive current that drives the discharge lamp; a state detecting section that detects a deteriorating state of the discharge lamp; and a control section that controls the discharge lamp driving section, wherein a period sandwiched between a time at which switching is performed and the next time at which switching is performed starts with a first period and ends with a second period, the control section controls the discharge lamp driving section so that the absolute value of the drive current becomes relatively small in the first period and relatively large in the second period, and the control section controls the discharge lamp driving section so that the ratio of the absolute value of the drive current in the second period to the absolute value of the drive current in the first period is increased with the progress of the deteriorating state.

The state detecting section may detect, as a value indicating the degree of the deteriorating state, for example, a drive voltage of the discharge lamp, a temporal change in the drive voltage of the discharge lamp, the amount of light of the discharge lamp, a temporal change in the amount of light of the discharge lamp, accumulated lighting time of the discharge lamp, or the like.

When the deteriorating state progresses, the fusibility of the electrode is reduced, which may cause deformation of the electrode. According to the aspect of the invention, by controlling the discharge lamp driving section so that the ratio of the absolute value of the drive current in the second period to the absolute value of the drive current in the first period is increased with the progress of the deteriorating state of the discharge lamp, it is possible to increase the fusibility of the electrode in the second period in particular. This makes it possible to prevent deformation of the electrode.

Moreover, according to the aspect of the invention, since the control section controls the discharge lamp driving section so that the absolute value of the drive current becomes relatively small in the first period and relatively large in the second period, it is possible to realize a projector that can project a image in such a way that the image appears bright. Furthermore, since the control section controls the discharge lamp driving section so that the ratio of the absolute value of the drive current in the second period to the absolute value of the drive current in the first period is increased with the progress of the deteriorating state of the discharge lamp, it is possible to prevent a reduction in the drive current in the second period. Therefore, it is possible to prevent a reduction in the brightness associated with the progress of the deteriorating state of the discharge lamp.

In the projector, in the second period, the control section may control the discharge lamp driving section so that the discharge lamp driving section supplies an alternating current to the discharge lamp as the drive current, and the control section may control the discharge lamp driving section so that at least part of the frequency of the drive current is decreased with the progress of the deteriorating state.

As a result, the current with the same polarity flows for a longer period of time in the second period. Therefore, it is possible to increase the fusibility of the electrode in the second period. This makes it possible to prevent deformation of the electrode.

In the projector, in the first period, the control section may control the discharge lamp driving section so that the discharge lamp driving section supplies an alternating current to the discharge lamp as the drive current, and the control section may control the discharge lamp driving section so that at least part of the frequency of the drive current is increased with the progress of the deteriorating state.

As a result, the current with the same polarity flows for a shorter period of time in the first period. Therefore, a low-temperature state continues for a shorter period of time in the first period. This makes it possible to prevent deformation of the electrode.

In the projector, the control section may control the discharge lamp driving section so that the average value of drive power throughout the first period and the second period becomes constant.

As a result, it is possible to prevent deterioration of the parts forming the discharge lamp driving section.

BRIEF DESCRIPTION OF THE DRAWINGS

The invention will be described with reference to the accompanying drawings, wherein like numbers reference like elements.

FIG. 9 is a table showing an example of a drive condition table.

DESCRIPTION OF EXEMPLARY EMBODIMENTS

Hereinafter, a preferred embodiment of the invention will be described in detail by using the drawings. It should be understood that the embodiment described below is not meant to limit unduly the scope of the invention claimed in the appended claims in any way, and all the configurations described below are not always necessary requirements of the invention.

1. Optical System of a Projector According to the Embodiment

Figure 1:
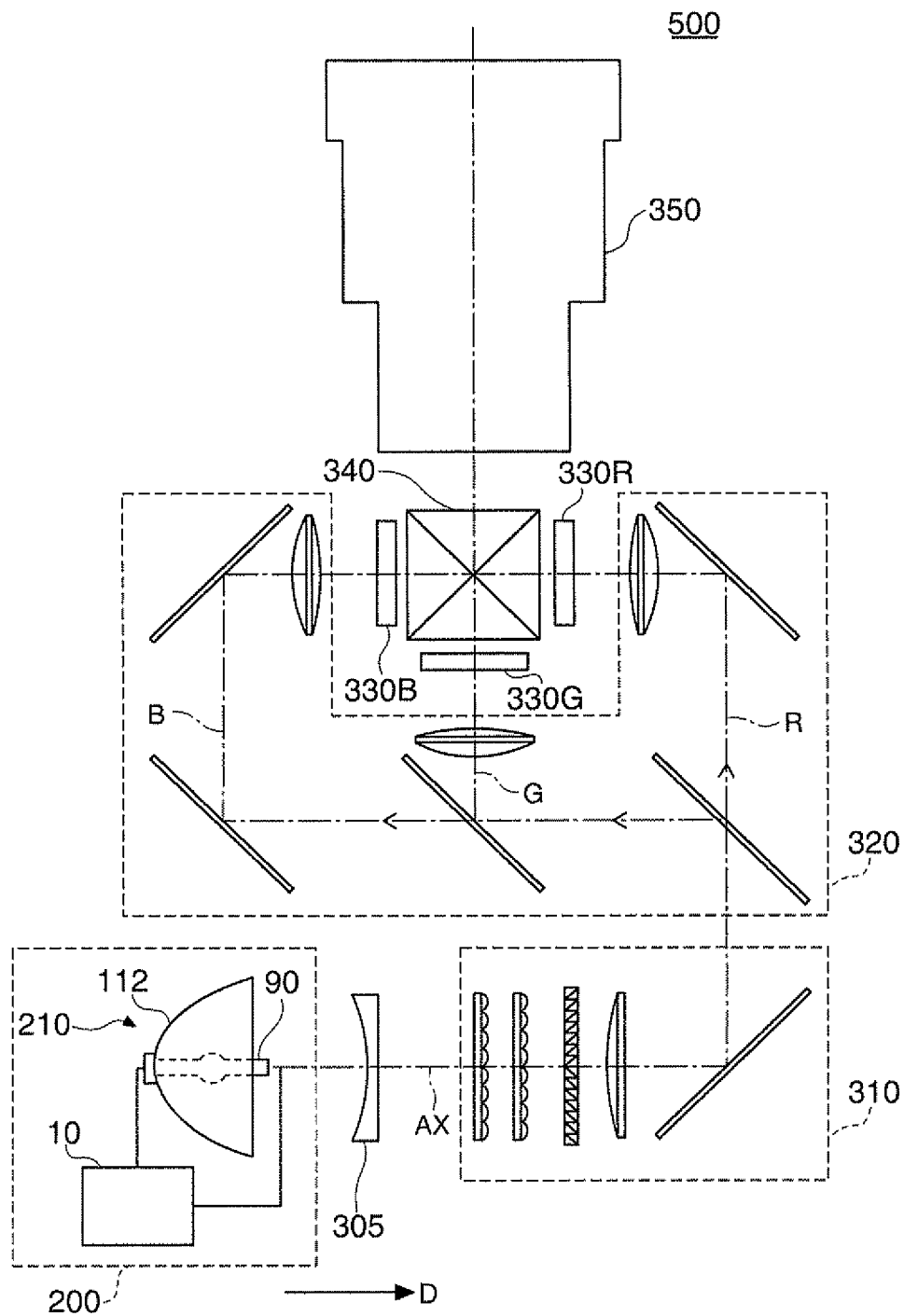
FIG. 1 is an explanatory diagram showing an optical system of a projector according to an embodiment.

FIG. 1 is an explanatory diagram showing an optical system of a projector 500 according to the embodiment. The projector 500 has a light source device 200, a parallelizing lens 305, an illumination system 310, a color separation system 320, three liquid crystal light valves 330R, 330G, and 330B, a cross dichroic prism 340, and a projection system 350.

The light source device 200 has a light source unit 210 and a discharge lamp lighting device 10. The light source unit 210 has a main reflection mirror 112, a sub-reflection mirror 50 (which will be described later), and a discharge lamp 90. The discharge lamp lighting device 10 supplies power to the discharge lamp 90 and turns on the discharge lamp 90. The main reflection mirror 112 reflects the light emitted from the discharge lamp 90 in a direction of radiation D. The direction of radiation D is parallel to an optical axis AX. The light from the light source unit 210 passes through the parallelizing lens 305 and enters the illumination system 310. The parallelizing lens 305 parallelizes the light from the light source unit 210.

The illumination system 310 makes the illuminance of the light from the light source device 200 uniform in the liquid crystal light valves 330R, 330G, and 330B. Moreover, the illumination system 310 makes the light from the light source device 200 have one polarization direction to make effective use of the light from the light source device 200 in the liquid crystal light valves 330R, 330G, and 330B. The light whose illuminance distribution and polarization direction have been adjusted enters the color separation system 320. The color separation system 320 separates the incident light into three colored lights: a red (R) light, a green (G) light, and a blue (B) light. The three colored lights are modulated by the liquid crystal light valves 330R, 330G, and 330B, each being related to a corresponding one of the three colors. The liquid crystal light valves 330R, 330G, and 330B include liquid crystal panels 560R, 560G, and 560E (which will be described later) and polarizers (not shown) which are disposed on light incident-sides and light-exiting sides of the liquid crystal panels 560R, 560G, and 560B. The three modulated colored lights are combined by the cross dichroic prism 340. The combined light enters the projection system 350. The projection system 350 projects the incident light onto an unillustrated screen. As a result, an image is displayed on the screen.

Incidentally, as the configurations of the parallelizing lens 305, the illumination system 310, the color separation system 320, the cross dichroic prism 340, and the projection system 350, various well-known configurations can be adopted.

Figure 2:
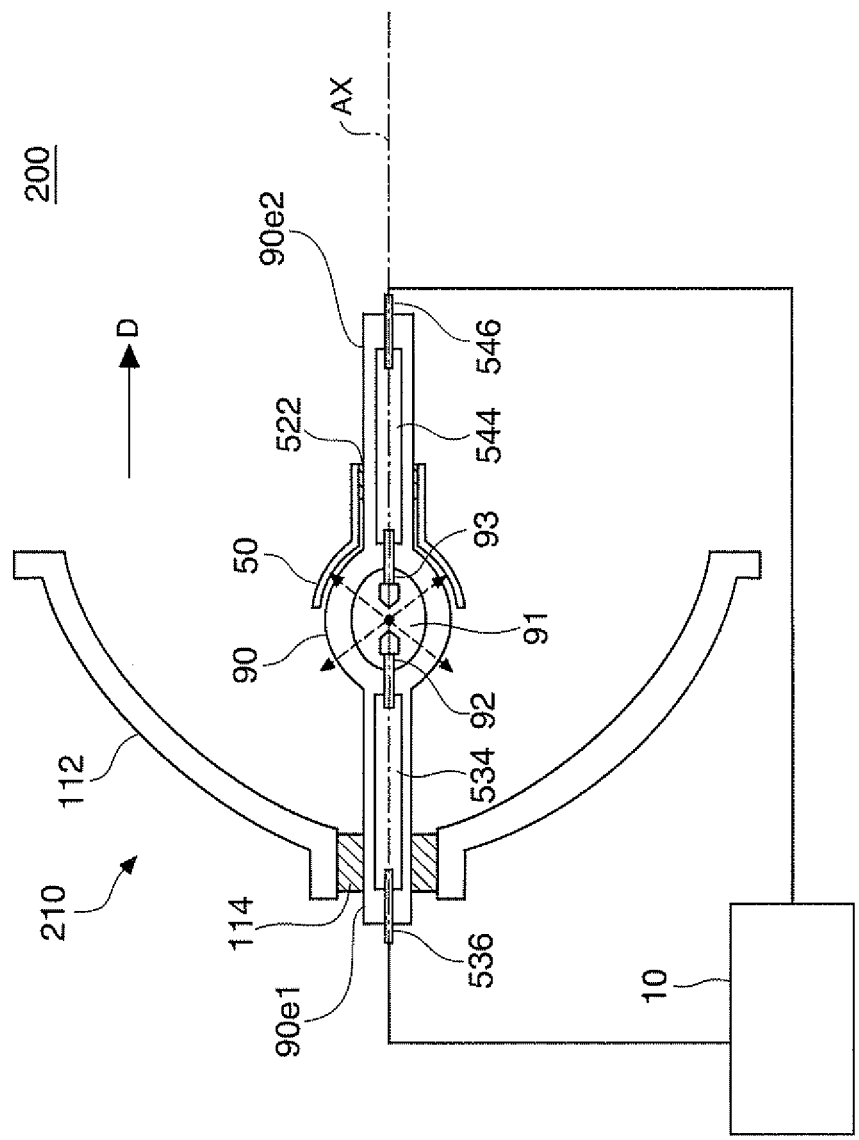
FIG. 2 is an explanatory diagram showing the configuration of a light source device.

FIG. 2 is an explanatory diagram showing the configuration of the light source device 200. The light source device 200 has the light source unit 210 and the discharge lamp lighting device 10. In the drawing, a sectional view of the light source unit 210 is shown. The light source unit 210 has the main reflection mirror 112, the discharge lamp 90, and the sub-reflection mirror 50.

The discharge lamp 90 has a rod-like shape extending from a first end 90e1 to a second end 90e2 in the direction of radiation D. The material of the discharge lamp 90 is, for example, a light-transmissive material such as silica glass. The discharge lamp 90 has a spherical bulge in the center thereof. Inside the spherical bulge, a discharge space 91 is formed. In the discharge space 91, gas which is a discharge medium containing mercury, rare gas, metal halide, and the like is encapsulated.

The discharge lamp 90 includes a first electrode 92 and a second electrode 93. In an example shown in FIG. 2, the first electrode 92 and the second electrode 93 are provided so as to jut into the discharge space 91. The first electrode 92 is disposed on the side of the discharge space 91 which is closer to the first end 90$e$1, and the second electrode 93 is disposed on the side of the discharge space 91 which is closer to the second end 90$e$2. The first electrode 92 and the second electrode 93 have a rod-like shape extending along the optical axis AX. In the discharge space 91, the electrode tips (also referred to as the "discharge ends") of the first electrode 92 and the second electrode 93 face each other with a predetermined distance kept between them. Incidentally, the material of the first electrode 92 and the second electrode 93 is, for example, metal such as tungsten.

At the first end 90$e$1 of the discharge lamp 90, a first terminal 536 is provided. The first terminal 536 and the first electrode 92 are electrically connected by a conductive member 534 passing through the discharge lamp 90. Similarly, at the second end 90$e$2 of the discharge lamp 90, a second terminal 546 is provided. The second terminal 546 and the second electrode 93 are electrically connected by a conductive member 544 passing through the discharge lamp 90. The material of the first terminal 536 and the second terminal 546 is, for example, metal such as tungsten. Moreover, as the conductive members 534 and 544, molybdenum foil, for example, is used.

The first terminal 536 and the second terminal 546 are connected to the discharge lamp lighting device 10. The discharge lamp lighting device 10 supplies, to the first terminal 536 and the second terminal 546, a drive current that drives the discharge lamp 90. As a result, arc discharge occurs between the first electrode 92 and the second electrode 93. As indicated by dashed arrows, the light (the discharge light) generated by the arc discharge is emitted in all directions from the discharge position.

To the first end 90$e$1 of the discharge lamp 90, the main reflection mirror 112 is fixed by a fixing member 114. The shape of a reflecting surface (a surface on the side facing the discharge lamp 90) of the main reflection mirror 112 is spheroidal. The main reflection mirror 112 reflects the discharge light in the direction of radiation D. Incidentally, the shape of the reflecting surface of the main reflection mirror 112 is not limited to a spheroidal shape, and various shapes by which the discharge light is reflected in the direction of radiation D can be adopted. For example, a rotated parabola-like shape may be adopted. In this case, the main reflection mirror 112 can convert the discharge light into a light which is nearly parallel to the optical axis AX. Therefore, it is possible to omit the parallelizing lens 305.

On the side of the discharge lamp 90 which is closer to the second end 90$e$2, the sub-reflection mirror 50 is fixed by a fixing member 522. A reflecting surface (a surface on the side facing the discharge lamp 90) of the sub-reflection mirror 50 has a spherical shape surrounding the side of the discharge space 91 which is closer to the second end 90$e$2. The sub-reflection mirror 50 reflects the discharge light toward the main reflection mirror 112. This makes it possible to increase the usage efficiency of the light emitted from the discharge space 91.

Incidentally, as the material of the fixing members 114 and 522, any heat-resistant material (for example, an inorganic adhesive) that is resistant to heat generated by the discharge lamp 90 can be adopted. Moreover, the method for fixing the placement of the main reflection mirror 112, the sub-reflection mirror 50, and the discharge lamp 90 is not limited to the method by which the main reflection mirror 112 and the sub-reflection mirror 50 are fixed to the discharge lamp 90, and any method can be adopted. For example, the discharge lamp 90 and the main reflection mirror 112 may be independently fixed to a housing (not shown) of the projector. The same goes for the sub-reflection mirror 50.

2. Circuit Configuration of the Projector According to the Embodiment

Figure 3:
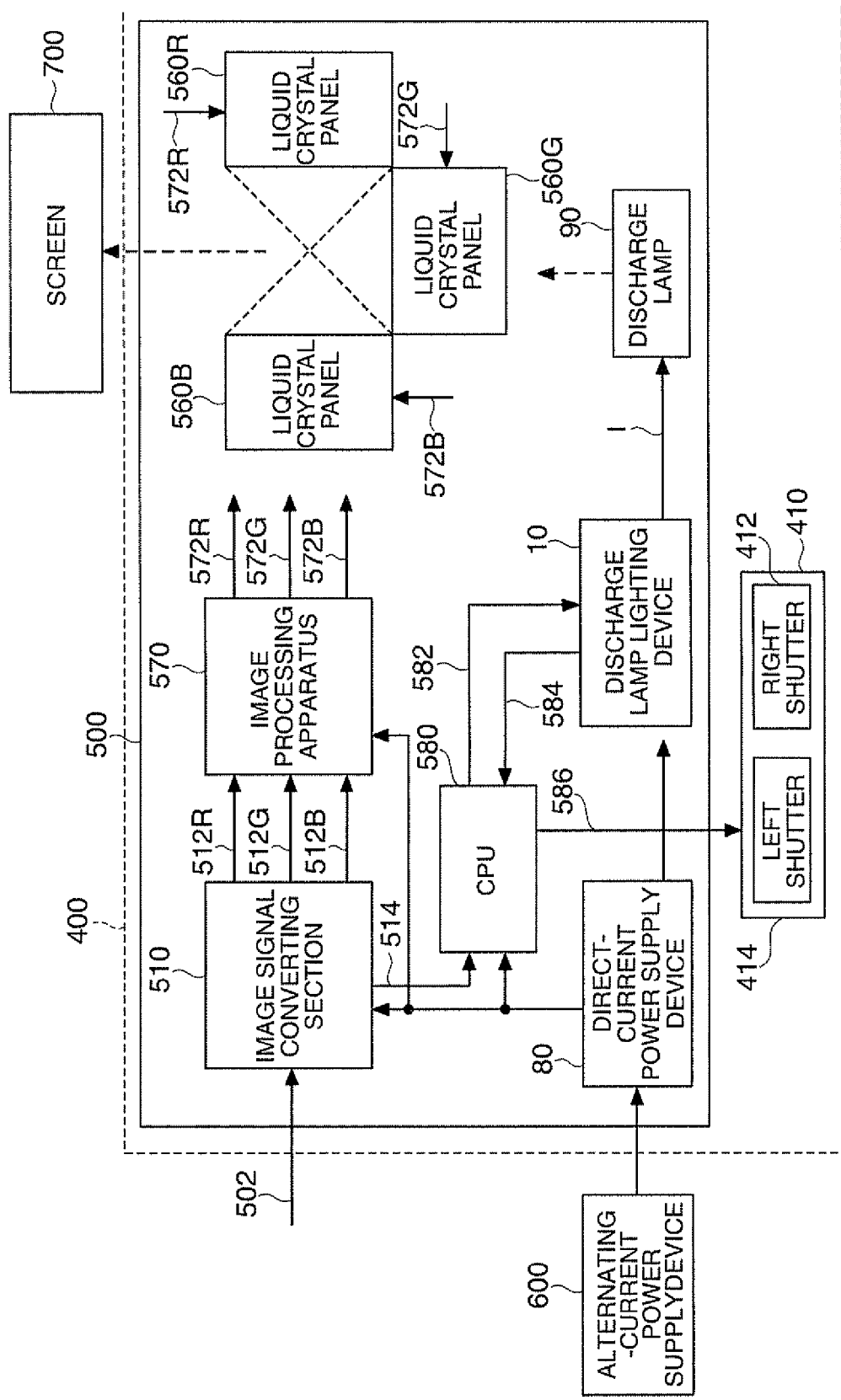
FIG. 3 is a diagram showing an example of a circuit configuration of the projector according to the embodiment.

FIG. 3 is a diagram showing an example of a circuit configuration of the projector according to the embodiment. In addition to the optical systems described earlier, the projector 500 may include an image signal converting section 510, a direct-current power supply device 80, the discharge lamp lighting device 10, the discharge lamp 90, the liquid crystal panels 560R, 560G, and 560B, an image processing apparatus 570, and a CPU (central processing unit) 580. Moreover, the projector can also be configured as a projector system 400 including the projector 500 and active shutter glasses 410.

The image signal converting section 510 converts an image signal 502 (such as a luminance-color difference signal or an analog RGB signal) input from the outside into a digital RGB signal with a predetermined word length, generates image signals 512R, 512G, and 512B, and supplies the signals to the image processing apparatus 570. Moreover, when a stereoscopic image signal in which a image alternates between a first image and a second image with given switching timing is input as the image signal 502, the image signal converting section 510 supplies a synchronizing signal 514 to the CPU 580 based on the switching timing with which switching between the first image and the second image is performed.

The image processing apparatus 570 performs image processing on the three image signals 5128, 512G, and 512B, and supplies, to the liquid crystal panels 5608, 560G, and 560B, driving signals 572R, 572G, and 572B for driving the liquid crystal panels 560R, 560G, and 560B.

The direct-current power supply device 80 converts an alternating voltage which is supplied from an external alternating-current power supply 600 into a constant direct voltage, and supplies the direct voltage to the image signal converting section 510 and the image processing apparatus 570 on the secondary side of a transformer (which is not shown, but is included in the direct-current power supply device 80) and the discharge lamp lighting device 10 on the primary side of the transformer.

The discharge lamp lighting device 10 forms a discharge path by generating a high voltage between the electrodes of the discharge lamp 90 at the time of startup and thereby producing a dielectric breakdown, and then supplies a drive current I by which the discharge lamp 90 maintains the discharge.

The liquid crystal panels 560R, 560G, and 560B each modulate the brightness of the colored light which enters each liquid crystal panel via the optical systems described earlier based on the driving signals 572R, 572G, and 572B.

The CPU 580 controls the operation of the projector after the projector is turned on until it is turned off. For example, the CPU 580 may output, to the discharge lamp lighting device 10, an instruction to turn on the discharge lamp or an instruction to turn off the discharge lamp via a communication signal 582. Moreover, the CPU 580 may receive lighting information of the discharge lamp 90 from the discharge lamp lighting device 10 via a communication signal 584. Furthermore, based on the synchronizing signal 514, the CPU 580 may output, to the active shutter glasses 410, a control signal 586 for controlling the active shutter glasses 410 in synchronization with the image signal 502 via a wired or wireless communication unit.

The active shutter glasses 410 may include a right shutter 412 and a left shutter 414. The right shutter 412 and the left shutter 414 are controlled so as to be opened and closed based on the control signal 586. When the user wears the active shutter glasses 410, the right eye's-side field of view can be blocked as a result of the right shutter 412 being closed. Moreover, when the user wears the active shutter glasses 410, the left eye's-side field of view can be blocked as a result of the left shutter 414 being closed. The right shutter 412 and the left shutter 414 may be formed as a liquid crystal shutter, for example.

3. Configuration of the Discharge Lamp Lighting Device in the Embodiment

Figure 4:
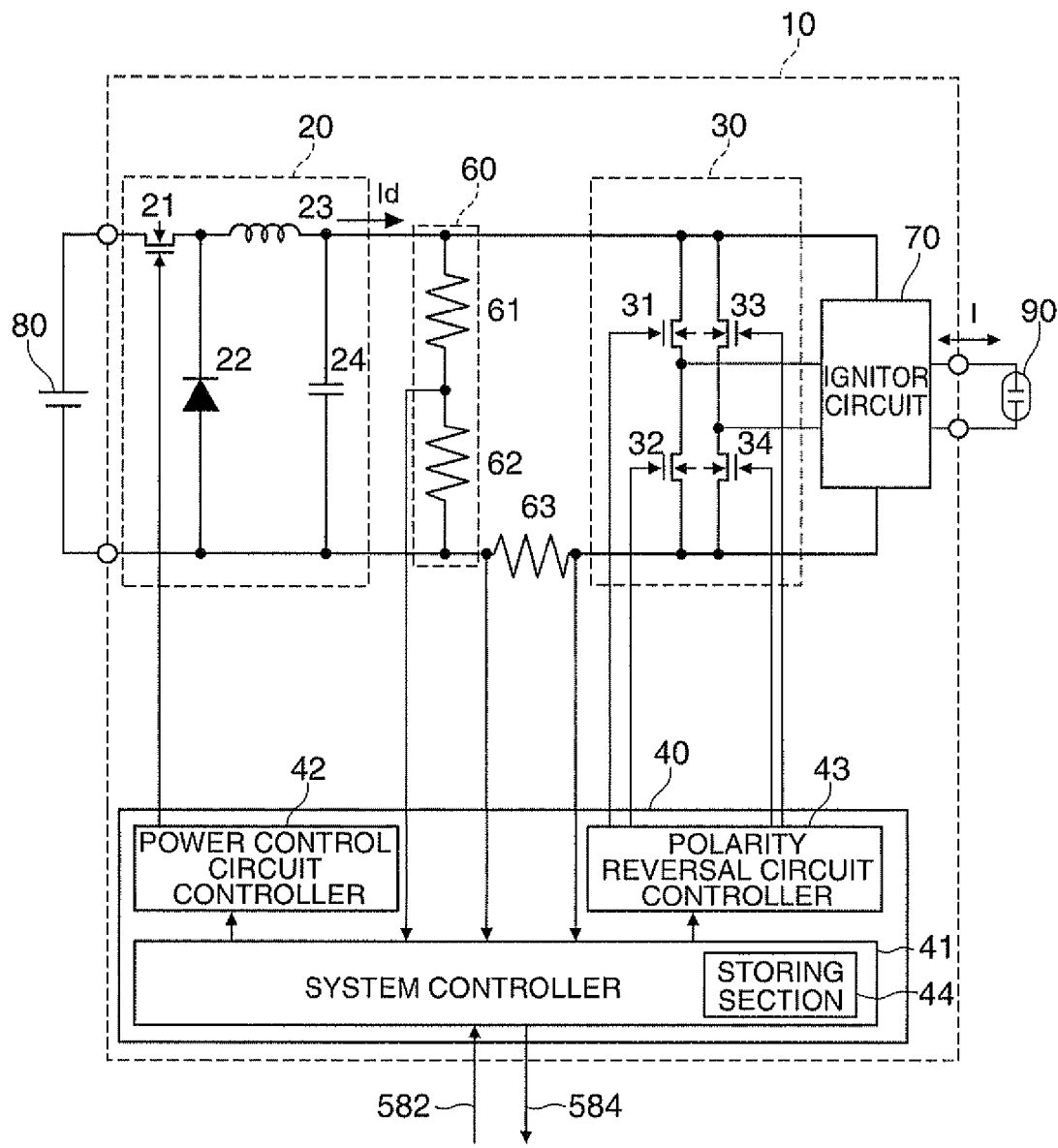
FIG. 4 is a diagram showing an example of a circuit configuration of a discharge lamp lighting device.

FIG. 4 is a diagram showing an example of a circuit configuration of the discharge lamp lighting device 10.

The discharge lamp lighting device 10 includes a power control circuit 20. The power control circuit 20 generates drive power which is supplied to the discharge lamp 90. In the embodiment, the power control circuit 20 is formed as a step-down chopper circuit that uses a direct-current power supply 80 as an input and outputs a direct current Id by stepping down the input voltage.

The power control circuit 20 can be configured so as to include a switch element 21, a diode 22, a coil 23, and a capacitor 24. The switch element 21 can be formed of a transistor, for example. In the embodiment, one end of the switch element 21 is connected to a positive voltage side of the direct-current power supply 80, and the other end is connected to a cathode terminal of the diode 22 and one end of the coil 23. Moreover, to the other end of the coil 23, one end of the capacitor 24 is connected, and the other end of the capacitor 24 is connected to an anode terminal of the diode 22 and a negative voltage side of the direct-current power supply 80. A current control signal is input to a control terminal of the switch element 21 from a control section 40 (which will be described later), whereby on/off of the switch element 21 is controlled. As the current control signal, a PWM (pulse width modulation) control signal, for example, may be used.

Here, when the switch element 21 turns on, a current flows through the coil 23 and energy is accumulated in the coil 23. Then, when the switch element 21 turns off, the energy accumulated in the coil 23 is released in a path passing through the capacitor 24 and the diode 22. As a result, the direct current Id commensurate with the proportion of the amount of time the switch element 21 is on is generated.

The discharge lamp lighting device 10 includes a polarity reversal circuit 30. The polarity reversal circuit 30 receives, as an input, the direct current Id output from the power control circuit 20 and reverses the polarity with given timing, and thereby generates and outputs the drive current I which is a direct current that continues only for a controlled time or an alternating current of any frequency. In the embodiment, the polarity reversal circuit 30 is formed as an inverter bridge circuit (a full-bridge circuit).

The polarity reversal circuit 30 includes, for example, a first switch element 31, a second switch element 32, a third switch element 33, and a fourth switch element 34 which are formed of a transistor or the like, and is formed by connecting, in parallel with each other, the first switch element 31 and the second switch element 32 which are connected in series and the third switch element 33 and the fourth switch element 34 which are connected in series. To the control terminals of the first switch element 31, the second switch element 32, the third switch element 33, and the fourth switch element 34, a polarity reversal control signal is input from the control section 40, and on/off of the first switch element 31, the second switch element 32, the third switch element 33, and the fourth switch element 34 is controlled based on the polarity reversal control signal.

The polarity reversal circuit 30 alternately reverses the polarity of the direct current Id which is output from the power control circuit 20 by alternately turning on/off the first switch element 31 and the fourth switch element 34 and the second switch element 32 and the third switch element 33, and generates and outputs the drive current I which is a direct current that continues only for a controlled time or an alternating current of a controlled frequency from a common junction point of the first switch element 31 and the second switch element 32 and a common junction point of the third switch element 33 and the fourth switch element 34.

That is, control is performed so that, when the first switch element 31 and the fourth switch element 34 are on, the second switch element 32 and the third switch element 33 are turned off, and, when the first switch element 31 and the fourth switch element 34 are off, the second switch element 32 and the third switch element 33 are turned on. Therefore, when the first switch element 31 and the fourth switch element 34 are on, the drive current I flowing from one end of the capacitor 24 to the fourth switch element 34 via the first switch element 31 and the discharge lamp 90 in this order is generated. Moreover, when the second switch element 32 and the third switch element 33 are on, the drive current I flowing from one end of the capacitor 24 to the second switch element 32 via the third switch element 33 and the discharge lamp 90 in this order is generated.

In the embodiment, the power control circuit 20 and the polarity reversal circuit 30 collectively correspond to a discharge lamp driving section 230. That is, the discharge lamp driving section 230 supplies, to the discharge lamp 90, the drive current I that drives the discharge lamp 90.

The discharge lamp lighting device 10 includes the control section 40. The control section 40 controls the discharge lamp driving section 230. In an example shown in FIG. 4, the control section 40 controls the power control circuit 20 and the polarity reversal circuit 30 and thereby controls the holding time for which the drive current I with the same polarity continues and the current value, frequency, etc. of the drive current I. The control section 40 performs polarity reversal control on the polarity reversal circuit 30 so as to control the holding time for which the drive current I with the same polarity continues and the frequency etc. of the drive current I by polarity reversal timing of the drive current I. Moreover, the control section 40 performs current control on the power control circuit 20 so as to control the current value of the direct current Id which is output from the power control circuit 20.

The configuration of the control section 40 is not limited to a particular configuration. In the embodiment, the control section 40 includes a system controller 41, a power control circuit controller 42, and a polarity reversal circuit controller 43. Incidentally, part or all of the control section 40 may be formed of a semiconductor integrated circuit. The system controller 41 controls the power control circuit controller 42 and the polarity reversal circuit controller 43 and thereby controls the power control circuit 20 and the polarity reversal circuit 30. The system controller 41 may control the power control circuit controller 42 and the polarity reversal circuit controller 43 based on a drive voltage Vla which is detected by a voltage detecting section 60, which will be described later, provided in the discharge lamp lighting device 10 and the drive current I.

In the embodiment, the system controller 41 includes a storing section 44. Incidentally, the storing section 44 may be provided independently of the system controller 41.

The system controller 41 may control the power control circuit 20 and the polarity reversal circuit 30 based on the information stored in the storing section 44. In the storing section 44, for example, the information on drive parameters such as the holding time for which the drive current I with the same polarity continues and the current value, frequency, waveform, modulation pattern, etc. of the drive current I may be stored.

The power control circuit controller 42 controls the power control circuit 20 by outputting the current control signal to the power control circuit 20 based on a control signal from the system controller 41.

The polarity reversal circuit controller 43 controls the polarity reversal circuit 30 by outputting the polarity reversal control signal to the polarity reversal circuit 30 based on the control signal from the system controller 41.

Figure 5:
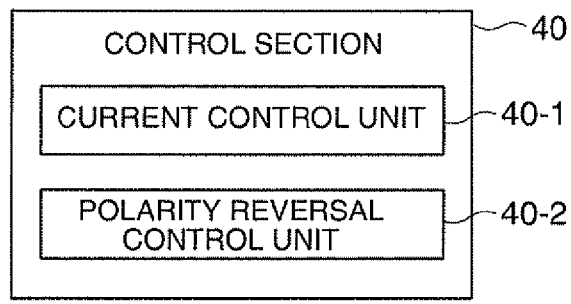
FIG. 5 is a diagram for explaining another configuration example of a control section.

Incidentally, the control section 40 can perform, by a dedicated circuit, the above-described control and various kinds of control of processing which will be described later, but the control section 40 can also perform various kinds of control of the processing by functioning as a computer as a result of a CPU (central processing unit), for example, executing a control program product stored in the storing section 44 or the like. FIG. 5 is a diagram for explaining another configuration example of the control section 40. As shown in FIG. 5, the control section 40 may be configured so as to function, by the control program product, as a current control unit 40-1 that controls the power control circuit 20 and a polarity reversal control unit 40-2 that controls the polarity reversal circuit 30.

Moreover, in the example shown in FIG. 4, the control section 40 is configured as part of the discharge lamp lighting device 10; however, the control section 40 may also be configured so that the CPU 580 shoulders part of the function of the control section 40.

The discharge lamp lighting device 10 may include an operation detecting section. The operation detecting section may include, for example, the voltage detecting section 60 that detects the drive voltage Vla of the discharge lamp 90 and outputs drive voltage information or a current detecting section that detects the drive current I and outputs drive current information. In the embodiment, the voltage detecting section 60 includes first and second resistances 61 and 62.

The voltage detecting section 60 corresponds to a state detecting section in the invention. That is, the state detecting section (the voltage detecting section 60) detects the drive voltage Vla as a value indicating the degree of deterioration of the electrode.

In the embodiment, the voltage detecting section 60 detects the drive voltage Vla based on a voltage obtained by voltage dividing performed by the first resistance 61 and the second resistance 62 which are connected in series and are connected in parallel with the discharge lamp 90. Moreover, in the embodiment, the current detecting section detects the drive current I based on a voltage which is generated in a third resistance 63 connected in series with the discharge lamp 90.

The discharge lamp lighting device 10 may include an ignitor circuit 70. The ignitor circuit 70 operates only when the discharge lamp 90 is turned on and supplies, between the electrodes of the discharge lamp 90 (between the first electrode 92 and the second electrode 93), a high voltage (a voltage which is higher than the voltage observed when the discharge lamp 90 is in a normal on state) necessary for forming a discharge path by producing a dielectric breakdown between the electrodes of the discharge lamp 90 (between the first electrode 92 and the second electrode 93) when the discharge lamp 90 is turned on. In the embodiment, the ignitor circuit 70 is connected in parallel with the discharge lamp 90.

Figure 6A:
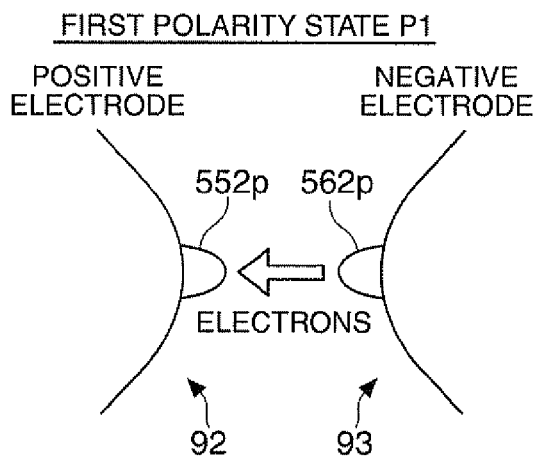
FIGS. 6A to 6D are explanatory diagrams showing the relationship between the polarity of a drive current I which is supplied to a discharge lamp and the temperature of an electrode.
Figure 6B:
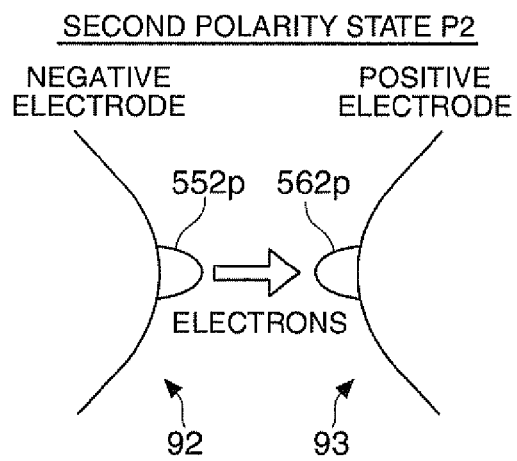

4. Relationship between the Polarity of the Drive Current and the Temperature of the Electrode FIGS. 6A to 6D are explanatory diagrams showing the relationship between the polarity of the drive current I which is supplied to the discharge lamp 90 and the temperature of the electrode. FIGS. 6A and 6B show the operation states of the first electrode 92 and the second electrode 93. In the drawings, the tip portions of the first electrode 92 and the second electrode 93 are shown. At the tips of the first electrode 92 and the second electrode 93, projections 552p and 562p are provided. The discharge which occurs between the first electrode 92 and the second electrode 93 mainly occurs between the projection 552p and the projection 562p. In the embodiment, it is possible to prevent the movement of the discharge positions (the arc positions) in the first electrode 92 and the second electrode 93 as compared to when no projection is provided. However, such projections may be omitted.

FIG. 6A shows a first polarity state P1 in which the first electrode 92 operates as a positive electrode and the second electrode 93 operates as a negative electrode. In the first polarity state P1, electrons move from the second electrode 93 (the negative electrode) to the first electrode 92 (the positive electrode) by discharge. The electrons are released from the negative electrode (the second electrode 93). The electrons released from the negative electrode (the second electrode 93) collide with the tip of the positive electrode (the first electrode 92). Heat is generated by this collision, and the temperature of the tip (the projection 552p) of the positive electrode (the first electrode 92) rises.

FIG. 6B shows a second polarity state 22 in which the first electrode 92 operates as a negative electrode and the second electrode 93 operates as a positive electrode. In the second polarity state 22, unlike the first polarity state 21, the electrons move from the first electrode 92 to the second electrode 93. As a result, the temperature of the tip (the projection 562p) of the second electrode 93 rises.

As described above, the temperature of the positive electrode is more likely to increase than the negative electrode. Here, if a state in which the temperature of one electrode is higher than the temperature of the other electrode continues, various malfunctions can occur. For example, when the tip of the high-temperature electrode is excessively melted, an unintended electrode deformation can appear. As a result, the arc length may deviate from an appropriate value. Moreover, when the tip of the low-temperature electrode is melted inadequately, minutes projections and depressions which have appeared in the tip can remain without being melted. As a result, so-called arc jump (a phenomenon in which the arc position becomes unstable and moves) may occur.

Figure 6C:
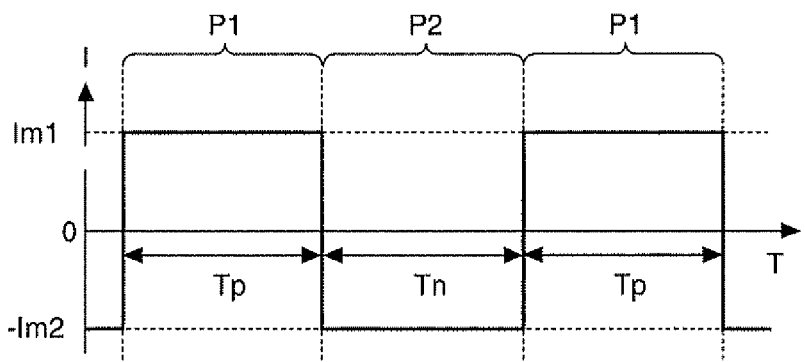

As a technique to prevent such malfunctions, AC drive by which the polarity of each electrode is repeatedly changed can be used. FIG. 6C is a timing chart showing an example of the drive current I which is supplied to the discharge lamp 90 (FIG. 2). The horizontal axis represents time T and the vertical axis represents the current value of the drive current I. The drive current I represents a current flowing through the discharge lamp 90. The positive value represents the first polarity state P1 and the negative value represents the second polarity state P2. In an example shown in FIG. 6C, a rectangular wave alternating current is used as the drive current I. In addition, in the example shown in FIG. 6C, the first polarity state P1 and the second polarity state P2 are repeated alternately. Here, a first polarity interval Tp represents the time for which the first polarity state P1 continues, and a second polarity interval Tn represents the time for which the second polarity state P2 continues. Moreover, in the example shown in FIG. 6C, the average current value of the first polarity interval Tp is Im1, and the average current value of the second polarity interval Tn is −Im2. Incidentally, the frequency of the drive current I appropriate for the driving of the discharge lamp 90 can be experimentally determined in accordance with the characteristics of the discharge lamp 90 (for example, a value in the 30 Hz-to-1 kHz range is adopted). The other values Im1, −Im2, Tp, and Tn can also be experimentally determined.

Figure 6D:
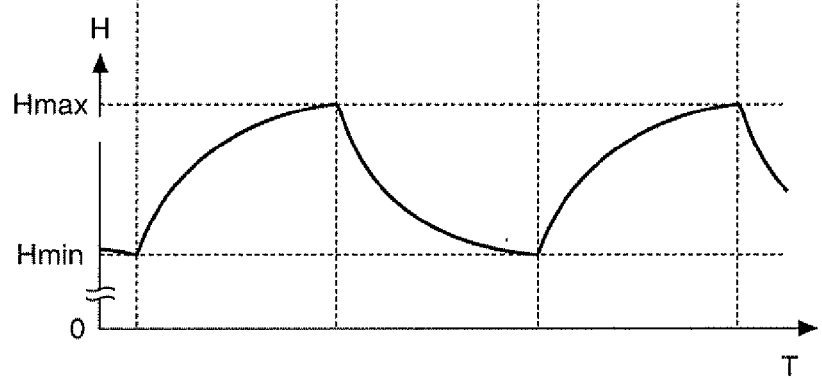

FIG. 6D is a timing chart showing a change in the temperature of the first electrode 92. The horizontal axis represents time T and the vertical axis represents the temperature H. In the first polarity state P1, the temperature H of the first electrode 92 rises; in the second polarity state P2, the temperature H of the first electrode 92 falls. Moreover, since the first polarity state P1 and the second polarity state P2 are repeated, the temperature H varies periodically between the minimum value Hmin and the maximum value Hmax. Though not shown in the drawing, the temperature of the second electrode 93 varies in a phase opposite to that of the temperature H of the first electrode 92. That is, i the first polarity state P1, the temperature of the second electrode 93 falls; in the second polarity state P2, the temperature of the second electrode 93 rises.

In the first polarity state P1, the tip of the first electrode 92 (the projection 552p) is melted, whereby the tip of the first electrode 92 (the projection 552p) becomes smooth. This makes it possible to prevent the movement of the discharge position in the first electrode 92. Moreover, since the temperature of the tip of the second electrode 93 (the projection 562p) falls, the second electrode 93 (the projection 562p) is prevented from being excessively melted. This makes it possible to prevent unintended electrode deformation. In the second polarity state P2, the situations of the first electrode 92 and the second electrode 93 are opposite to those described above. Therefore, by repeating the two states P1 and P2, it is possible to prevent the malfunctions in the first electrode 92 and the second electrode 93.

Here, when the waveform of the drive current I is symmetrical, that is, when the waveform of the drive current I meets the conditions that "|Im1|=|−Im2| and Tp=Tn", the first electrode 92 and the second electrode 93 are the same in condition of the supplied power. Therefore, when the first electrode 92 and the second electrode 93 are the same in thermal condition (the temperature's readiness to rise or fall), it is estimated that the temperature difference between the first electrode 92 and the second electrode 93 becomes smaller.

Moreover, when a wide range of the electrode is excessively heated (when an arc spot (a hot spot on the surface of the electrode associated with arc discharge) becomes larger), the electrode loses its shape due to excessive melting. On the other hand, when the electrode is excessively cooled (when the arc spot becomes smaller), it becomes impossible to melt the tip of the electrode adequately, whereby the tip cannot be restored to a smooth state, that is, the tip of the electrode tends to be deformed. Therefore, when a state in which energy is uniformly supplied to the electrodes continues, the tips (the projection 552p and the projection 562p) of the electrodes tend to be deformed into unintended shapes.

5. Example of Control of the Drive Current in the Embodiment

Next, a specific example of control of the drive current I in the projector 500 according to the embodiment will be described.

Figure 7:
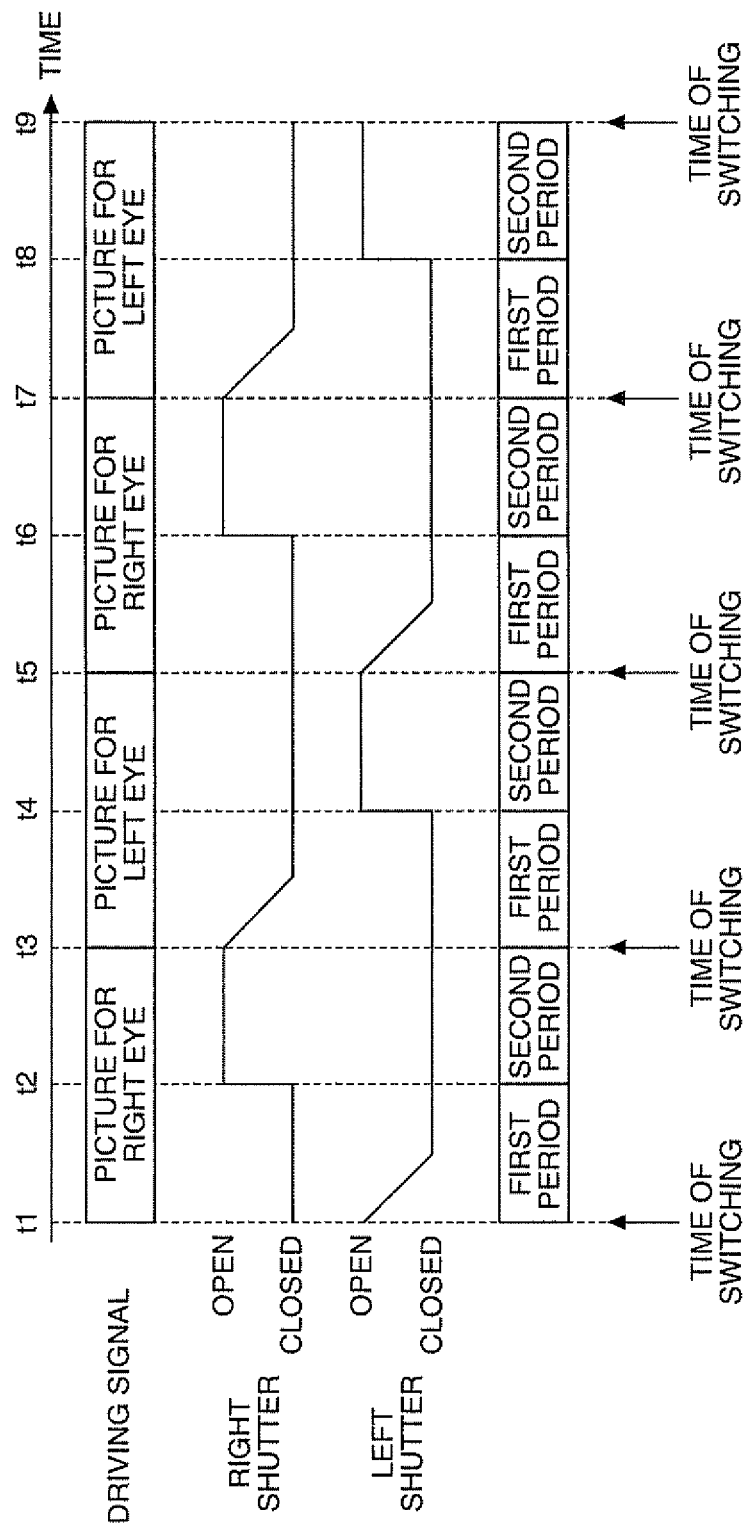
FIG. 7 is a diagram for explaining a first period, a second period, and switching timing.

FIG. 7 is a diagram for explaining a first period, a second period, and switching timing. In FIG. 7, from above, the contents of the driving signals 572R, 572G, and 572B, the open and closed state of the right shutter 412, the open and closed state of the left shutter 414, and the temporal relationship between the first period and the second period and switching timing are shown. The horizontal axis of FIG. 7 represents time. Hereinafter, an example in which the observer is made to view a display image stereoscopically by using the first image and the second image as a image for the right eye and a image for the left eye, respectively, will be described.

In an example shown in FIG. 7, the driving signals 572R, 572G, and 572B are driving signals corresponding to the image for the right eye as the first image from time t1 to time t3, the image for the left eye as the second image from time t3 to time t5, the image for the right eye as the first image from time t5 to time t7, and the image for the left eye as the second image from time t7 to time t9. Therefore, in the example shown in FIG. 7, the projector 500 outputs the image for the right eye as the first image and the image for the left eye as the second image alternately while performing switching between them by using time t1, time t3, time t5, time t7, and time t9 as time at which switching is performed.

A period sandwiched between a time at which switching is performed and the next time at which switching is performed starts with the first period and ends with the second period. In the example shown in FIG. 7, for example, a period sandwiched between time t1 and time t3, at which switching is performed, starts with the first period from time t1 to time t2 and ends with the second period from time t2 to time t3. The same goes for a period sandwiched between time t3 and time t5, at which switching is performed, a period sandwiched between time t5 and time t7, at which switching is performed, and a period sandwiched between time t7 and time t9, at which switching is performed. Incidentally, in the example shown in FIG. 7, the first period and the second period have the same length; however, the length of the first period and the length of the second period can be appropriately set as needed. Moreover, a third period may exist between the first period and the second period. In the third period, control which is different from the control of the drive current I in the first period and the second period, which will be described later, may be performed.

The right shutter 412 is in an open state in a period which is at least part of the period in which the driving signals 572R, 572G, and 572B corresponding to the image for the right eye as the first image are input to the liquid crystal panels 560R, 560G, and 560B. In the example shown in FIG. 7, the right shutter 412 is in a closed state from time t1 to time t2 and is in an open state from time t2 to time t3. Moreover, in the example shown in FIG. 7, in the period in which the driving signals 572R, 572G, and 572B corresponding to the image for the left eye as the second image are input to the liquid crystal panels 560R, 560G, and 560B, the right shutter 412 starts to close from time t3, is completely closed between time t3 and time t4, and is in a closed state from time t4 to time t5. A change in the open and closed state of the right shutter 412 from time t5 to time t9 is the same as a change in the open and closed state from time t1 to time t5.

The left shutter 414 is in an open state in a period which is at least part of the period in which the driving signals 572R, 572G, and 572B corresponding to the image for the left eye as the second image are input to the liquid crystal panels 560R, 560G, and 560B. In the example shown in FIG. 7, the left shutter 414 is in a closed state from time t3 to time t4 and is in an open state from time t4 to time t5. Moreover, in the example shown in FIG. 7, in the period in which the driving signals 572R, 572G, and 572B corresponding to the image for the right eye as the first image are input to the liquid crystal panels 560R, 560G, and 560B, the left shutter 414 starts to close from time t1, is completely closed between time t1 and time t2, and is in a closed state from time t2 to time t3. A change in the open and closed state of the left shutter 414 from time t5 to time t9 is the same as a change in the open and closed state from time t1 to time t5.

In the example shown in FIG. 7, in the period in which the driving signals 572R, 572G, and 572B corresponding to the image for the right eye as the first image are input to the liquid crystal panels 560R, 560G, and 560B, a period in which the right shutter 412 is closed corresponds to the first period and a period in which the right shutter 412 is open corresponds to the second period. Moreover, in the example shown in FIG. 7, in the period in which the driving signals 572R, 572G, and 572B corresponding to the image for the left eye as the second image are input to the liquid crystal panels 560R, 560G, and 560B, a period in which the left shutter 414 is closed corresponds to the first period and a period in which the left shutter 414 is open corresponds to the second period. Furthermore, in the example shown in FIG. 7, in the first period, a period in which both the right shutter 412 and the left shutter 414 are closed exists.

In the projector 500 according to the embodiment, the control section 40 controls the discharge lamp driving section 230 so that the absolute value of the drive current I becomes relatively small in the first period and relatively large in the second period and the ratio of the absolute value of the drive current I in the second period to the absolute value of the drive current I in the first period is increased with the progress of the deteriorating state of the discharge lamp 90.

The state detecting section may detect, as a value indicating the degree of the deteriorating state, for example, the drive voltage Vla of the discharge lamp 90, a temporal change in the drive voltage Vla of the discharge lamp 90, the amount of light of the discharge lamp 90, a temporal change in the amount of light of the discharge lamp 90, accumulated lighting time of the discharge lamp 90, or the like. In the embodiment, the voltage detecting section 60 (the state detecting section) detects the drive voltage Vla of the discharge lamp 90 as the deteriorating state of the discharge lamp 90.

Figure 8:
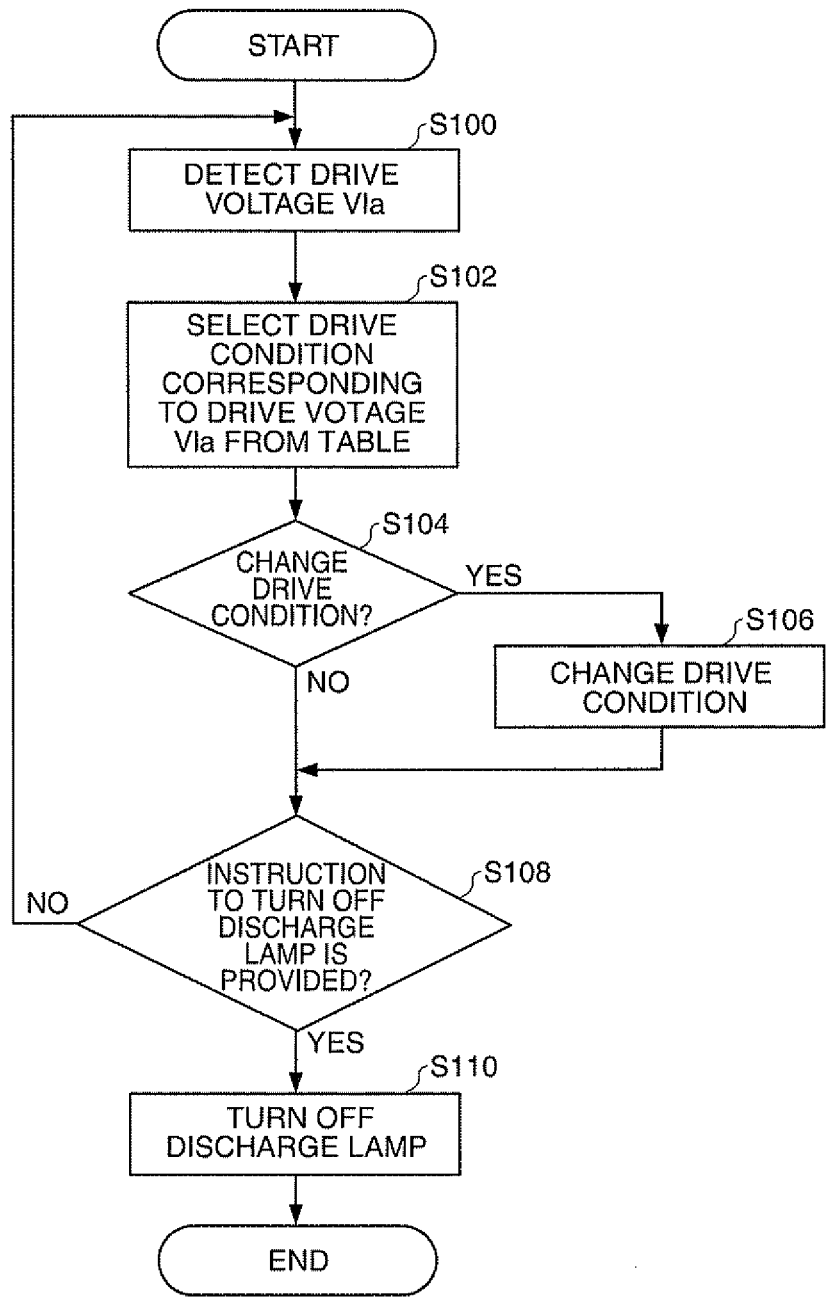
FIG. 8 is a flowchart showing a control example of the projector according to the embodiment.

FIG. 8 is a flowchart showing a control example of the projector 500 according to the embodiment. In the flowchart shown in FIG. 8, the control which is performed after the discharge lamp 90 is stably turned on until it is turned off is shown.

First, the voltage detecting section 60 detects the drive voltage Vla (step S100). Next, the control section 40 selects a drive condition corresponding to the drive voltage Vla detected in step S100 from a table stored in the storing section 44 (step S102).

FIG. 9 is a table showing an example of a drive condition table. In an example shown in FIG. 9, "waveform" represents waveform examples shown in FIGS. 10A to 10F which will be described later, IH represents the absolute value of the drive current I in the second period, IL represents the absolute value of the drive current I in the first period, f2 represents the frequency of the drive current I in the second period, and f1 represents the frequency of the drive current I in the first period.

In the example shown in FIG. 9, all of the ratios IH/IL of the absolute value IH of the drive current I in the second period to the absolute value IL of the drive current I in the first period are more than 1. That is, the absolute value of the drive current I is relatively small in the first period as compared to that in the second period, and is relatively large in the second period as compared to that in the first period. Moreover, in the example shown in FIG. 9, the ratio IH/IL of the absolute value IH of the drive current I in the second period to the absolute value IL of the drive current I in the first period is increased as the drive voltage Vla becomes greater. It is preferable that the variation width of the ratio IH/IL of the absolute value IH of the drive current I in the second period to the absolute value IL of the drive current I in the first period (the difference between the drive conditions which are next to each other) be a variation width that cannot be visually identified by the user (for example, a variation width corresponding to a change of the order of a few W).

After the drive condition is selected in step S102 of FIG. 8, the control section 40 determines whether or not there is a need to change the drive condition (step S104). If the control section 40 determines that there is a need to change the drive condition (YES in step S104), the control section 40 changes the drive condition to the drive condition selected in step S102 and drives the discharge lamp 90 (step S106). If the control section 40 determines that there is no need to change the drive condition (NO in step S104), the control section 40 continues to drive the discharge lamp 90 in a previous drive condition.

When NO is chosen in step S104 or after step S106 is performed, the control section 40 determines whether or not an instruction to turn off the discharge lamp 90 is provided (step S108). If the control section 40 determines that an instruction to turn off the discharge lamp 90 is provided (YES in step S108), the control section 40 ends lighting of the discharge lamp 90 (turns off the discharge lamp 90). If the control section 40 determines that an instruction to turn off the discharge lamp 90 is not provided (NO in step S108), the control section 40 repeats the control from steps S100 to S108 until an instruction to turn off the discharge lamp 90 is provided.

When the deteriorating state of the first electrode 92 and the second electrode 93 of the discharge lamp 90 progresses, the distance between the first electrode 92 and the second electrode 93 (the distance between the electrodes) is increased. When the distance between the electrodes is increased, the drive voltage Vla rises. That is, the drive voltage Vla rises with the progress of the deteriorating state of the discharge lamp 90.

When the deteriorating state of the discharge lamp 90 progresses, the fusibility of the electrode is reduced. Therefore, by increasing the ratio IH/IL of the absolute value IH of the drive current I in the second period to the absolute value IL of the drive current I in the first period with a rise in the drive voltage Vla (with the progress of the deteriorating state of the discharge lamp 90), it is possible to increase the fusibility of the electrode in the second period in particular and prevent deformation of the electrode. Moreover, when the deteriorating state of the discharge lamp 90 does not progress, by not increasing the fusibility of the electrode more than necessary, it is possible to prevent harmful effects such as blackening caused by too high fusibility of the electrode.

Furthermore, with the projector 500 according to the embodiment, since the control section 40 controls the discharge lamp driving section 230 so that the absolute value of the drive current I becomes relatively small in the first period and relatively large in the second period, it is possible to realize a projector that can project a image in such a way that the image appears bright. In addition, since the control section 40 controls the discharge lamp driving section 230 so that the ratio IH/IL of the absolute value of the drive current I in the second period to the absolute value of the drive current I in the first period is increased with the progress of the deteriorating state of the discharge lamp 90, it is possible to prevent a reduction in the drive current I in the second period which is a period in which a image is shown to the user. This makes it possible to prevent a reduction in the brightness associated with the progress of the deteriorating state of the discharge lamp.

Figure 10A:
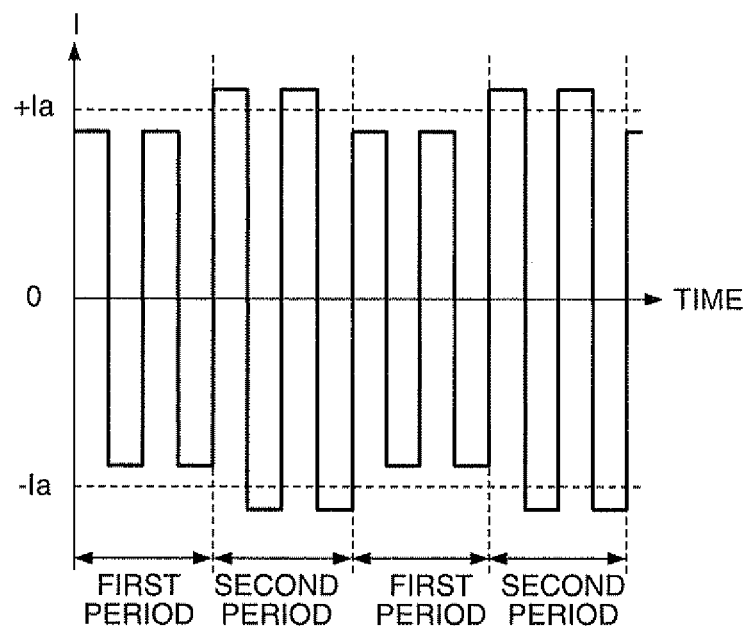
FIG. 10A is a timing chart showing a waveform example in the drive condition shown in FIG. 9.
Figure 10B:
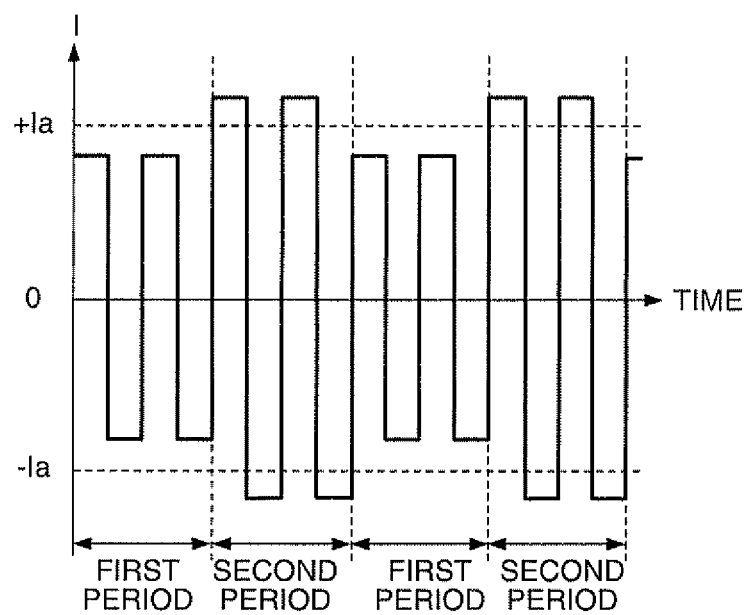
FIG. 10B is a timing chart showing a waveform example in the drive condition shown in FIG. 9.
Figure 10C:
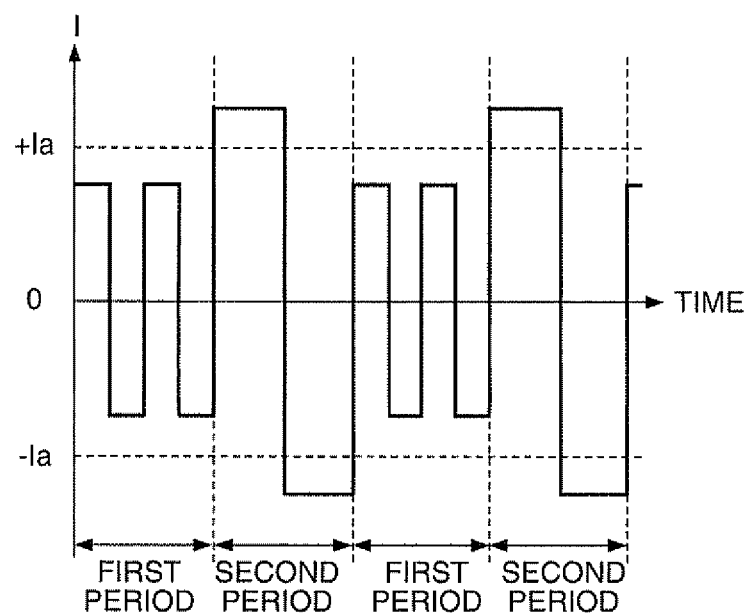
FIG. 10C is a timing chart showing a waveform example in the drive condition shown in FIG. 9.
Figure 10D:
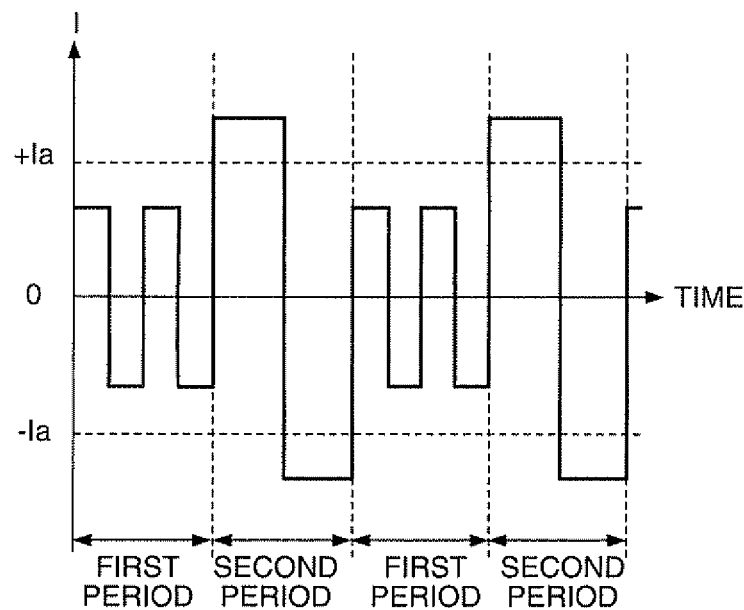
FIG. 10D is a timing chart showing a waveform example in the drive condition shown in FIG. 9.
Figure 10E:
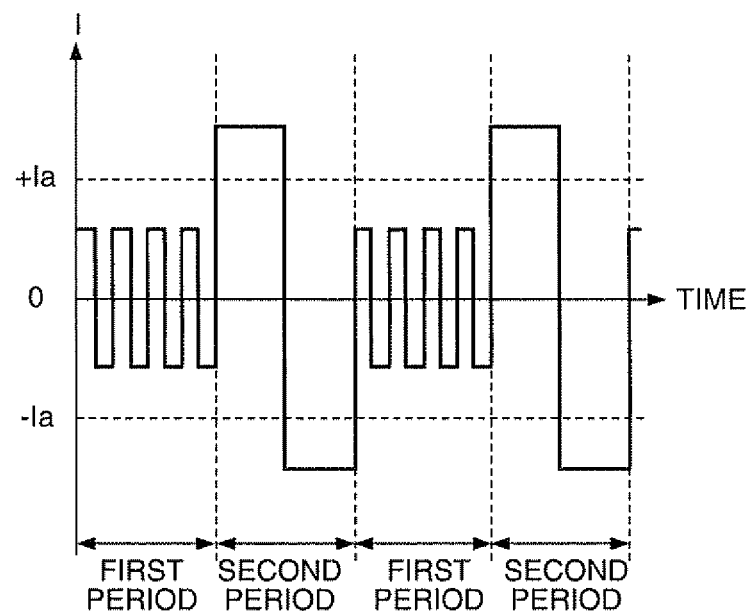
FIG. 10E is a timing chart showing a waveform example in the drive condition shown in FIG. 9.

FIGS. 10A to 10F are timing charts showing waveform examples in the drive conditions shown in FIG. 9. FIG. 10A corresponds to a waveform A shown in FIG. 9 when the drive voltage Vla is 60 V, FIG. 10B corresponds to a waveform B shown in FIG. 9 when the drive voltage Vla is 70 V, FIG. 10C corresponds to a waveform C shown in FIG. 9 when the drive voltage Vla is 80 V, FIG. 10D corresponds to a waveform D shown in FIG. 9 when the drive voltage Vla is 90 V, FIG. 10E corresponds to a waveform E shown in FIG. 9 when the drive voltage Vla is 100 V, and FIG. 10F corresponds to a waveform F shown in FIG. 9 when the drive voltage Vla is 110 V. In the examples shown in FIGS. 10A to 10F, the first period and the second period have the same length.

In the examples shown in FIGS. 10A to 10F, the control section 40 controls the discharge lamp driving section 230 so that the average value of the drive power throughout the first period and the second period becomes constant. This makes it possible to prevent deterioration of the parts forming the discharge lamp driving section.

Moreover, in FIGS. 10A to 10F, the absolute value of the drive current I when the discharge lamp 90 is temporarily driven in the first period and the second period by the average value of the drive power throughout the first period and the second period is shown as Ia. Therefore, the greater the drive voltage Vla becomes, the smaller Ia becomes.

In the examples shown in FIGS. 10A to 10F, the ratio IH/IL of the absolute value IH of the drive current I in the second period to the absolute value IL of the drive current I in the first period is increased with a rise in the drive voltage Vla (with the progress of the deteriorating state of the discharge lamp 90). Therefore, it is possible to increase the fusibility of the electrode in the second period in particular and prevent deformation of the electrode.

Moreover, since the discharge lamp driving section 230 is controlled so that the ratio IH/IL of the absolute value of the drive current I in the second period to the absolute value of the drive current I in the first period is increased with the progress of the deteriorating state of the discharge lamp 90, it is possible to prevent a reduction in the drive current I in the second period which is a period in which a image is shown to the user. This makes it possible to prevent a reduction in the brightness associated with the progress of the deteriorating state of the discharge lamp.

In the second period, the control section 40 may control the discharge lamp driving section 230 so that the discharge lamp driving section 230 supplies an alternating current to the discharge lamp 90 as the drive current I and control the discharge lamp driving section 230 so that at least part of the frequency of the drive current I is decreased with the progress of the deteriorating state of the discharge lamp 90. In the examples shown in FIG. 9 and FIGS. 10A to 10F, in the second period, the control section 40 controls the discharge lamp driving section 230 so that the discharge lamp driving section 230 supplies, to the discharge lamp 90, an alternating current whose frequency is constant in the second period as the drive current I and controls the discharge lamp driving section 230 so that the frequency of the drive current I is decreased with the progress of the deteriorating state of the discharge lamp 90.

As a result, the current with the same polarity flows for a longer period of time in the second period. Therefore, it is possible to increase the fusibility of the electrode in the second period. This makes it possible to prevent deformation of the electrode. Moreover, when the deteriorating state of the discharge lamp 90 does not progress, by not increasing the fusibility of the electrode more than necessary, it is possible to prevent harmful effects such as blackening caused by too high fusibility of the electrode.

Furthermore, in the examples shown in FIGS. 10A to 10E, in the second period, the control section 40 controls the discharge lamp driving section 230 so that the discharge lamp driving section 230 supplies, to the discharge lamp 90, an alternating current which is the integral multiple of one period as the drive current I. As a result, it is possible to keep a heat load balance between the electrodes of the discharge lamp. This makes it possible to prevent one of the electrodes of the discharge lamp from wearing out.

Figure 10F:
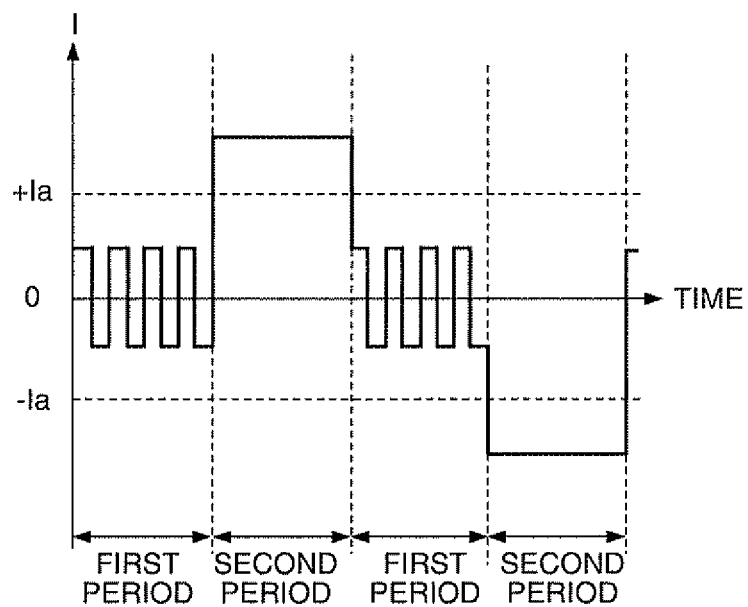
FIG. 10F is a timing chart showing a waveform example in the drive condition shown in FIG. 9.

Incidentally, in the example shown in FIG. 10F, polarity reversal does not occur in the second period because the frequency of the drive current I is low. That is, when attention is focused on one second period, the drive current I can be equated with a direct current. In such a case, a current having reverse polarity in two second periods which sandwich one first period in terms of time may be used as the drive current I. By doing so, it is possible to keep a heat load balance between the electrodes of the discharge lamp. This makes it possible to prevent one of the electrodes of the discharge lamp from wearing out.

Furthermore, in the second period, the control section 40 may control the discharge lamp driving section 230 so that the discharge lamp driving section 230 supplies, to the discharge lamp 90, an alternating current of a plurality of types of frequency in the second period as the drive current I. In this case, the control section 40 may control the discharge lamp driving section 230 so that at least part of the frequency of the alternating current of a plurality of types of frequency in the second period of the drive current I is decreased with the deterioration of the discharge lamp 90. In other words, the control section 40 may control the discharge lamp driving section 230 so that the discharge lamp driving section 230 supplies, to the discharge lamp 90 as the drive current I, an alternating current whose average frequency (for example, a frequency per period of the drive current I) in the second period is decreased with the deterioration of the discharge lamp 90.

As a result, the current with the same polarity flows for a longer period of time in the second period. This makes it possible to increase the fusibility of the electrode in the second period. Therefore, it is possible to prevent deformation of the electrode. Moreover, when the deteriorating state of the discharge lamp 90 does not progress, by not increasing the fusibility of the electrode more than necessary, it is possible to prevent harmful effects such as blackening caused by too high fusibility of the electrode.

In the first period, the control section 40 may control the discharge lamp driving section 230 so that the discharge lamp driving section 230 supplies an alternating current to the discharge lamp 90 as the drive current I and control the discharge lamp driving section 230 so that at least part of the frequency of the drive current I is increased with the progress of the deteriorating state of the discharge lamp 90. In the examples shown in FIG. 9 and FIGS. 10A to 10F, in the first period, the control section 40 controls the discharge lamp driving section 230 so that the discharge lamp driving section 230 supplies, to the discharge lamp 90, an alternating current whose frequency is constant in the first period as the drive current I and controls the discharge lamp driving section 230 so that the frequency of the drive current I is increased with the progress of the deteriorating state of the discharge lamp 90.

As a result, the current with the same polarity flows for a shorter period of time in the first period. Therefore, a low-temperature state continues for a shorter period of time in the first period. This makes it possible to prevent deformation of the electrode.

Moreover, in the examples shown in FIGS. 10A to 10F, in the first period, the control section 40 controls the discharge lamp driving section 230 so that the discharge lamp driving section 230 supplies, to the discharge lamp 90, an alternating current which is the integral multiple of one period as the drive current I. As a result, it is possible to keep a heat load balance between the electrodes of the discharge lamp. This makes it possible to prevent one of the electrodes of the discharge lamp from wearing out.

Incidentally, it is also possible to make the drive current I in the first period have a low frequency at which polarity reversal does not occur in the first period. That is, the drive current I which can be equated with a direct current when attention is focused on one first period may be used. In such a case, a current having reverse polarity in two first periods which sandwich one second period in terms of time may be used as the drive current I. By doing so, it is possible to keep a heat load balance between the electrodes of the discharge lamp. This makes it possible to prevent one of the electrodes of the discharge lamp from wearing out.

Furthermore, in the first period, the control section 40 may control the discharge lamp driving section 230 so that the discharge lamp driving section 230 supplies, to the discharge lamp 90, an alternating current of a plurality of types of frequency in the first period as the drive current I. In this case, the control section 40 may control the discharge lamp driving section 230 so that at least part of the frequency of the alternating current of a plurality of types of frequency in the first period of the drive current I is increased with the deterioration of the discharge lamp 90. In other words, the control section 40 controls the discharge lamp driving section 230 so that the discharge lamp driving section 230 supplies, to the discharge lamp 90 as the drive current I, an alternating current whose average frequency (for example, a frequency per period of the drive current I) in the first period is increased with the deterioration of the discharge lamp 90.

As a result, the current with the same polarity flows for a shorter period of time in the first period. Therefore, a low-temperature state continues for a shorter period of time in the first period. This makes it possible to prevent deformation of the electrode.

Incidentally, the examples shown in FIG. 9 and FIGS. 10A to 10F show only a case in which the ratio IH/IL of the absolute value of the drive current I in the second period to the absolute value of the drive current I in the first period is more than 1. However, for example, when the deteriorating state does not progress (for example, when the drive voltage Vla is less than 60 V in FIG. 9), the ratio IH/IL of the absolute value of the drive current I in the second period to the absolute value of the drive current I in the first period may be set at 1.

Moreover, in the examples shown in FIGS. 10A to 10F, the absolute value of the drive current I in the first period and the absolute value of the drive current I in the second period are constant in each period; however, the invention is not limited thereto. For example, when the absolute value of the drive current I in the first period and the absolute value of the drive current I in the second period vary in each period, the control section 40 may control the discharge lamp driving section 230 so that the average value of the absolute value of the drive current I in each period becomes relatively small in the first period and relatively large in the second period. Moreover, for example, when the absolute value of the drive current I in the first period and the absolute value of the drive current I in the second period vary in each period, the control section 40 may control the discharge lamp driving section 230 so as to take the minimum value of the absolute value of the drive current I in the first period and take the maximum value of the absolute value of the drive current I in the second period.

In the embodiment described above, a configuration in which the projector 500 makes the observer view a display image stereoscopically by using a first image and a second image as a image for the right eye and a image for the left eye, respectively, has been adopted; however, the invention is not limited thereto. For example, as a projector, a configuration in which a first image and a second image are provided as images with different contents and different observers are made to identify visually two display images (the first image and the second image) in such a way that one observer views one of the display images and the other observer views the other of the display images may be adopted.

When such a configuration is adopted, as the active shutter glasses, it is necessary simply to provide two types of glasses: glasses having, on the right and left eyeglasses, shutters that operate in the same way as the right shutter 412 described earlier and glasses having, on the right and left eyeglasses, shutters that operate in the same way as the left shutter 414 described earlier.

In the embodiment described above, a description has been given by taking up a projector using three liquid crystal panels as an example; however, the invention is not limited thereto. The invention can also be applied to a projector using one, two, or four or more liquid crystal panels.

In the embodiment described above, a description has been given by taking up a transmissive projector as an example; however, the invention is not limited thereto. The invention can also be applied to a reflective projector. Here, "transmissive" means that, like a transmissive liquid crystal panel or the like, an electrooptic modulating device as a light modulating unit transmits light, and "reflective" means that, like a reflective liquid crystal panel, a micromirror light modulating device, or the like, an electrooptic modulating device as a light modulating unit reflects light. As the micromirror light modulating device, a DMD (Digital Micromirror Device, which is a trademark of Texas Instruments Inc.), for example, can be used. The same effects as those of the transmissive projector can also be obtained when the invention is applied to the reflective projector.

The invention can be applied to a front projection projector which projects a projection image from the observer's side and a rear projection projector which projects a projection image from the side opposite to the observer's side.

It is to be understood that the invention is not limited to the embodiment described above and various modifications are possible within the scope of the subject matter of the invention.

The invention includes a configuration which is substantially identical to the configuration described in the embodiment (for example, a configuration having the same function, method, and result as those of the configuration described in the embodiment or a configuration having the same objective and effects as those of the configuration described in the embodiment). Moreover, the invention includes a configuration in which a nonessential portion of the configuration described in the embodiment is replaced with another portion. Furthermore, the invention includes a configuration that can obtain the same effects as those of the configuration described in the embodiment or achieve the same objective as that of the configuration described in the embodiment. In addition, the invention includes a configuration which is obtained by adding a publicly-known technique to the configuration described in the embodiment.

The entire disclosure of Japanese Patent Application No. 2010-283287, filed Dec. 20, 2010 is expressly incorporated by reference herein.

What is claimed is:

1. A projector that outputs a first image and a second image alternately while performing switching between the first image and the second image with given switching timing, comprising:
    a discharge lamp;
    a discharge lamp driving section that supplies, to the discharge lamp, a drive current that drives the discharge lamp;
    a state detecting section that detects a deteriorating state of the discharge lamp; and
    a control section that controls the discharge lamp driving section,
    wherein
    a period sandwiched between a time at which switching is performed and the next time at which switching is performed starts with a first period and ends with a second period,
    the control section controls the discharge lamp driving section so that the absolute value of the drive current becomes relatively small in the first period and relatively large in the second period, and
    the control section controls the discharge lamp driving section so that the ratio of the absolute value of the drive current in the second period to the absolute value of the drive current in the first period is increased with the progress of the deteriorating state.

2. The projector according to claim 1, wherein
in the second period,
    the control section controls the discharge lamp driving section so that the discharge lamp driving section supplies an alternating current to the discharge lamp as the drive current, and
    the control section controls the discharge lamp driving section so that at least part of the frequency of the drive current is decreased with the progress of the deteriorating state.

3. The projector according to claim 1, wherein
in the first period,
    the control section controls the discharge lamp driving section so that the discharge lamp driving section supplies an alternating current to the discharge lamp as the drive current, and
    the control section controls the discharge lamp driving section so that at least part of the frequency of the drive current is increased with the progress of the deteriorating state.

4. The projector according to claim 1, wherein
the control section controls the discharge lamp driving section so that the average value of drive power throughout the first period and the second period becomes constant.

* * * * *